United States Patent

[11] 3,623,969

| [72] | Inventor | Tomotsuru Hushihara<br>Tokyo, Japan |
| --- | --- | --- |
| [21] | Appl. No. | 744,886 |
| [22] | Filed | July 15, 1968 |
| [45] | Patented | Nov. 30, 1971 |
| [73] | Assignee | Sandeigurafe Co., Ltd.<br>Tokyo, Japan |
| [32] | Priority | Oct. 2, 1967 |
| [33] | | Japan |
| [31] | | 42/63216 |

[54] PORTABLE APPARATUS FOR PROCESSING WATER
2 Claims, 3 Drawing Figs.

[52] U.S. Cl. .................................................... 204/271,
204/151, 204/103, 204/252
[51] Int. Cl. ......................................................... B01k 3/00,
B01k 3/10
[50] Field of Search ........................................... 204/151,
252, 271, 295, 103

[56] References Cited
UNITED STATES PATENTS

| 480,492 | 8/1892 | Cutten ........................ | 204/252 X |
| --- | --- | --- | --- |
| 620,683 | 3/1899 | Uehling ........................ | 204/252 X |
| 665,953 | 1/1901 | Chalandre et al. ............ | 204/103 X |
| 1,003,041 | 9/1911 | Ekstrom ....................... | 204/252 X |
| 1,039,266 | 9/1912 | Dieffenbach ................. | 204/252 X |
| 1,102,209 | 6/1914 | Byrnes .......................... | 204/103 X |
| 1,464,840 | 8/1923 | Allan ............................ | 204/295 X |
| 1,603,298 | 10/1926 | Speed .......................... | 204/151 X |
| 2,466,020 | 4/1949 | Goldberg ..................... | 128/185 |
| 2,535,035 | 12/1950 | Briggs .......................... | 204/151 |
| 2,546,254 | 3/1951 | Briggs .......................... | 204/263 |
| 2,793,183 | 5/1957 | Thurman ..................... | 204/151 |
| 3,135,673 | 6/1964 | Tirrell et al. ................. | 204/98 |

Primary Examiner—John H. Mack
Assistant Examiner—A. C. Prescott
Attorney—McGlew & Toren ABSTRACT: A method of processing water is comprised of the steps of filling water into two separate chambers formed by dividing a container made of a nonconductive material with a common porous wall and then passing direct current between electrodes each located within one of the chambers for separating the water into acidic water and alkaline water.

INVENTOR.
TOMOTSURU HUSHIHARA

PORTABLE APPARATUS FOR PROCESSING WATER

An apparatus for processing water is formed of a housing holding a container made of a nonconductive material and divided by a porous wall member into two separate chambers. An electrode is positioned within each chamber and is connected into an electrical system mounted within the housing for passing direct current through the electrodes for separating water into acidic water in one chamber and alkaline water in the other chamber.

SUMMARY OF THE INVENTION

The present invention is directed to a method of and apparatus for processing water and, more specifically, it is directed to an arrangement for passing direct current between electrodes in separate chambers of a container for obtaining acidic water and alkaline water.

The primary object of the present invention is to provide a simple method of and apparatus for obtaining acidic water and alkaline water from ordinary city water by passing direct current through electrodes submerged in separate chambers containing the water.

Another object of the invention is to place the water to be processed into a container formed of a nonconductive material and to divide the container into two separate chambers by means of a porous wall member. A sealing material is provided around the periphery of the porous wall in contact with the container to assure that there is no leakage of water between the two separate chambers at these contacting surfaces.

Still another object of the invention is to utilize a pair of carbon electrodes connected into a supply of direct current with one electrode forming an anode in one of the chambers and the other forming a cathode in the other chamber.

Moreover, another object of the invention is to provide a portable apparatus for use in the home wherein the housing is openable for gaining easy access to the container supported within the housing.

Yet another object of the invention is to incorporate an electrical system into the housing for use in processing the water.

A further object of the invention is to provide a drain cock in each of the chambers for removing processed water from the container.

Still another object of the invention is to provide an arrangement which is simple in construction and is easy to operate.

Therefore, in the present invention a water processing device is comprised of a housing holding a container divided by a porous wall member into a pair of separate chambers. The peripheral surface of the porous wall member is provided with a resilient or elastic-type material for effecting a seal with the container to prevent the passage of water from one chamber to the other between the contacting surfaces of the wall member and the container. The container is formed of a nonconductive material and a carbon electrode is positioned in each of its chambers. An electrical system is contained within the housing for passing direct current through the electrodes. As direct current is passed through the electrodes, the water in the chamber containing the anode is converted into acidic water while the water in the other chamber is converted into alkaline water. During the electrolytic conduction step, water from the anode chamber permeates through the porous wall into the cathode chamber.

Further, the invention is concerned with a method of forming a pair of separate chambers with a container made of a nonconductive material. A carbon electrode is placed into each of the containers and the electrodes are connected to an electrical system for supplying a source of direct current to the electrodes. During the electrolytic conduction established in the container, the water in one chamber is converted into acidic water and the water in the other chamber is converted into alkaline water.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
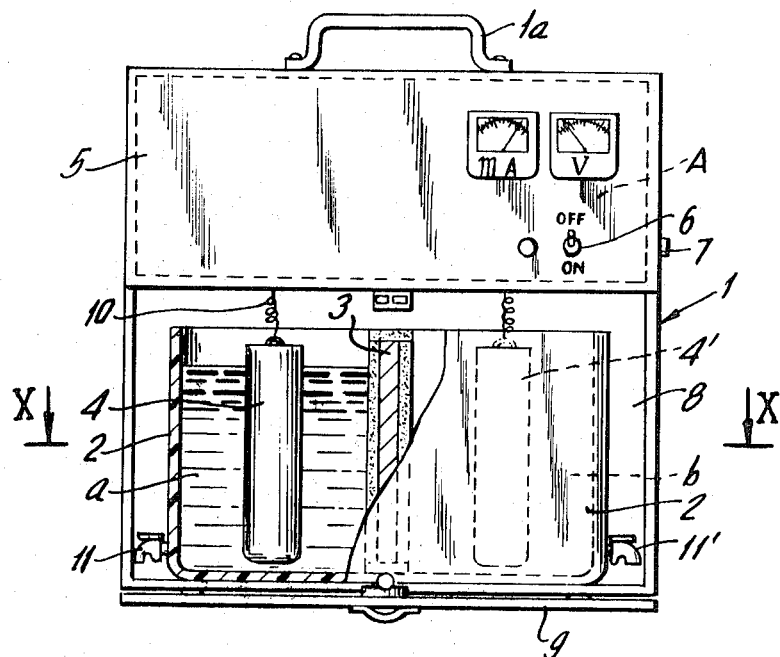
FIG. 1 is a front view of a housing incorporating an embodiment of the invention with a portion of the housing opened and a container within the housing shown partly in section.
Figure 2:
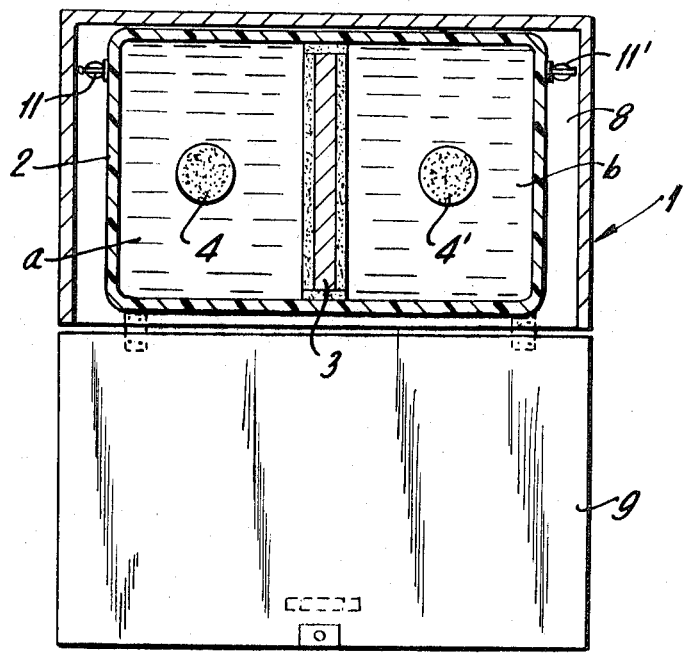
FIG. 2 is a sectional view taken along the line X—X in FIG. 1.
Figure 3:
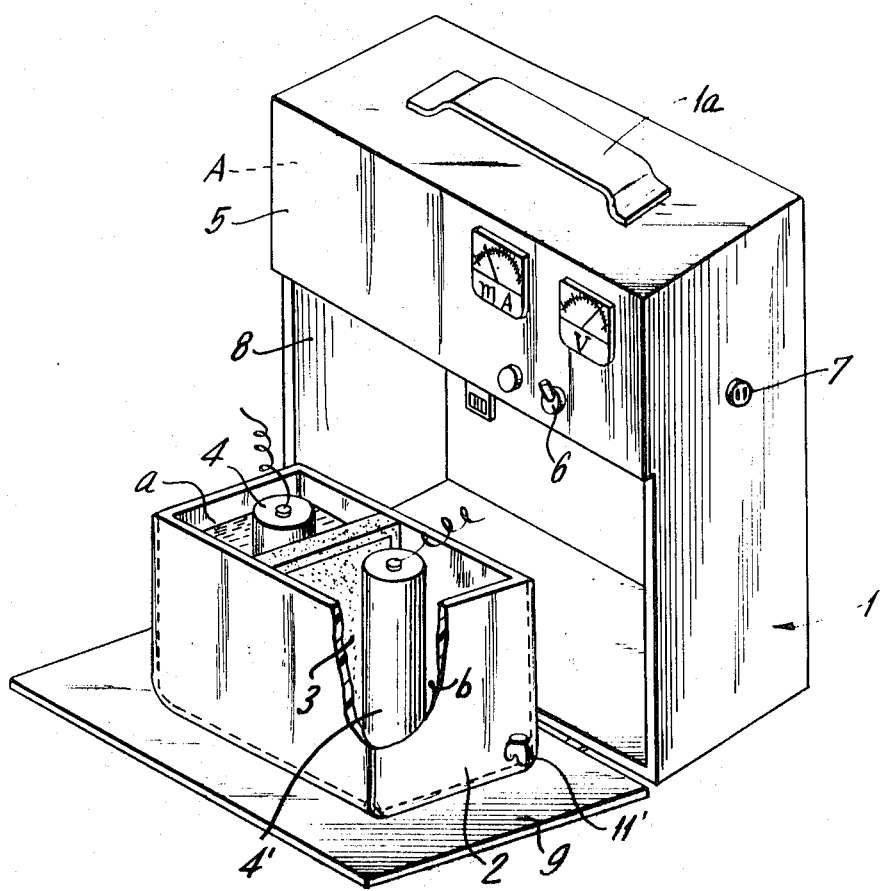
FIG. 3 is a perspective view of the housing and the container shown in FIG. 1.

In the drawing a housing 1 holds a container 2 in its lower part and supports an electrical compartment 5 in its upper part. On the top of the housing 1 a handle 1a is provided for ease in carrying the housing. The lower section 8 of the housing 1 holding the container 2 has a removable plate 9 shown in the opened position. The container 2 is constructed of a nonconductive material, such as a synthetic resin, and an unglazed board or wall member 3 is disposed in the vertical position within and divides the interior of the container into a pair of chambers a, b. The wall member or diaphragm 3 is formed of a porous water-permeable material and its periphery in contact with the inner walls of the container is covered with an elastic or resilient material, such as caoutchouc or a soft synthetic resin for effecting a seal between the contacting surfaces. Carbon electrodes 4, 4' are arranged within the container 2 and are connected into an electrical system A located within the electrical compartment 5. One of the electrodes forms an anode while the other electrode acts as a cathode. As viewed in the drawing, the left-hand chamber is the anode chamber $a$ (electrode 4) and the right-hand chamber is the cathode chamber $b$ (electrode 4').

Within the electrical compartment 5 of the housing, the electrical system A is comprised of a condenser and a rectifier, not shown, an off-on switch 6 situated on the exterior of the housing and a supply cord 7 is affixed to the side of the housing for connection into a supply of electrical power. The electrodes 4, 4' are connected into the electrical system A in compartment 5 by flexible leads 10 extending from compartment 5, and are supplied with direct current at 70/100v. with a power consumption of about 15w.

In operation, the lid plate 9 is removed from the front panel of the housing and the container is then easily accessible. The electrodes 4, 4' are connected to the electrical system A and are inserted into the chambers $a$ and $b$. Both of the chambers $a$ and $b$ in the container 2 are filled with water and because of the sealing effect achieved by the peripheral border material on the wall member 3, there is no passage of water between the two chambers at the joint between the container and the wall member 3. When the switch 6 is moved into the on position, direct current, as indicated above, passes through the electrodes with the electrode in chamber $a$ acting as the anode and the electrode in chamber $b$ acting as the cathode. Within the chambers $a$ and $b$, the water is electrolyzed and is converted gradually within the cathode chamber into alkaline water since some of the salts contained in the water are partially ionized. At the same time the water in the anode chamber $a$ passes through the porous wall member 3 and increases the amount of water in the cathode chamber. In this fashion the water in the anode chamber $a$ gradually changes to acidic water.

As can be easily appreciated from the description of the foregoing apparatus, the present invention provides a simple arrangement for the separation of ordinary city water into alkaline water and acidic water. In view of the apparatus employed, this separation operation can be effectively carried out at home. Alkaline water is useful for therapeutic purposes, for example in gastroenteric disorders as well as for use in growing or breeding plants and animals. Acidic water has cosmetic uses as an astringent and, in addition, it can be used for medical purposes as well as for certain breeding uses.

What is claimed is:

1. Portable electrolytic water-processing apparatus, for separating mineral water into acidic water and alkaline water, comprising, in combination, a housing having a carrying handle; means including a substantially horizontal partition, dividing said housing into an upper electrical component compartment and a lower compartment; said lower compartment having a front panel movable between a vertical, compartment-closing position and a horizontal forwardly extending position, a container supported in said lower compartment and movable therefrom onto said panel when said panel is in its said horizontal position, said container having bottom, side and end walls and a vertical diaphragm extending, in sealed relation with said side and bottom walls, between said sidewalls and dividing said container into two substantially equal chambers; said diaphragm comprising porous material permeable to water; respective carbon electrodes disposed in said chambers; and respective flexible leads extending from said partition and connecting said electrodes to electrical components in said upper compartment to apply a unidirectional electric potential between said electrodes.

2. Portable electrolytic water processing apparatus, as claimed in claim 1, including electrical control and indicating units mounted on a front wall of said upper electrical component compartment.

* * * * *